United States Patent
Nishida

(10) Patent No.: US 9,591,182 B2
(45) Date of Patent: Mar. 7, 2017

(54) INFORMATION PROCESSING SYSTEM AND METHOD, AND RECORDING MEDIUM

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/315,472

(22) Filed: Jun. 26, 2014

(65) Prior Publication Data

US 2015/0022846 A1 Jan. 22, 2015

(30) Foreign Application Priority Data

Jul. 22, 2013 (JP) ................................. 2013-151538

(51) Int. Cl.
*H04N 1/44* (2006.01)
*G06K 15/00* (2006.01)
*G06F 3/12* (2006.01)

(52) U.S. Cl.
CPC ......... *H04N 1/4433* (2013.01); *G06F 3/1222* (2013.01); *G06F 3/1239* (2013.01); *G06F 3/1288* (2013.01)

(58) Field of Classification Search
CPC ............. G06K 15/4095; H04N 1/4433; H04N 2201/0094; G06F 3/12; G06F 3/1288; G06F 3/1239; G06F 3/1222
USPC ................................................ 358/1.14, 1.1
See application file for complete search history.

(56) References Cited

U.S. PATENT DOCUMENTS

| 8,629,999 B2 | 1/2014 | Nishida |
| 2005/0099653 A1* | 5/2005 | Kawaoka ........... H04N 1/00209 358/1.15 |
| 2008/0168542 A1* | 7/2008 | Sato ................................ 726/5 |
| 2012/0300268 A1 | 11/2012 | Oseto et al. |
| 2012/0310788 A1* | 12/2012 | Naono ................... G06Q 30/06 705/27.1 |
| 2013/0329245 A1 | 12/2013 | Nishida |
| 2014/0211233 A1* | 7/2014 | Biswal .................. G06F 3/1238 358/1.14 |

FOREIGN PATENT DOCUMENTS

| JP | 2001-051915 | 2/2001 |
| JP | 2004-236348 | 8/2004 |
| JP | 2012-248006 | 12/2012 |
| JP | 2014-016979 | 1/2014 |

\* cited by examiner

*Primary Examiner* — Iriana Cruz
(74) *Attorney, Agent, or Firm* — IPUSA, PLLC

(57) ABSTRACT

An information processing system, which includes one or more computers connected to an apparatus via a network, includes a reception part configured to receive a request addressed to a predetermined destination, a generation part configured to generate authority identification information for identifying operation authority to operate the apparatus, in response to reception of the request, a storage part configured to store the authority identification information generated by the generation part, and a transmission part configured to transmit the authority identification information to the transmission source of the request. The apparatus is configured to limit a value settable with respect to a setting related to a function of the apparatus, when the authority identification information stored in the storage part is input to the apparatus.

15 Claims, 14 Drawing Sheets

FIG.6

| USERNAME | PASSWORD | EMAIL ADDRESS | 52 |
|---|---|---|---|
| A | ..... | aaa@xxxxx | ..... |
| B | ..... | bbb@xxxxx | ..... |
| .. | .. | .. | .. |

FIG.7

| JOB NAME | USER MODE | USERNAME | PIN CODE | PRINT DATA | 62 |
|---|---|---|---|---|---|
| XXX | G | A | F12 | ..... | ..... |
| YYY | U | A | ..... | ..... | ..... |
| .. | .. | .. | .. | .. | .. |

FIG.8

| EMAIL ADDRESS | PIN CODE | AUTHORIZED USERNAME |
|---|---|---|
| aaa@xxxxx | F93 | A |
| bbb@xxxxx | A98 | A |
| ccc@xxxxx | P23 | B |
| xxx@xxxxx | L30 | B |
| yyy@xxxxx | W52 | A |

FIG.14

| EMAIL ADDRESS | PIN CODE | AUTHORIZED USERNAME | AUTHORITY INFORMATION |
|---|---|---|---|
| aaa@xxxxx | F93 | A | Print/Scan |
| bbb@xxxxx | A98 | A | Scan |
| ccc@xxxxx | P23 | B | Fax |
| xxx@xxxxx | L30 | B | Print |
| yyy@xxxxx | W52 | A | Scan |

19

INFORMATION PROCESSING SYSTEM AND METHOD, AND RECORDING MEDIUM

CROSS-REFERENCE TO RELATED APPLICATION

The present application is based upon and claims the benefit of priority of Japanese Patent Application No. 2013-151538, filed on Jul. 22, 2013, the entire contents of which are incorporated herein by reference.

BACKGROUND OF THE INVENTION

1. Field of the Invention

The present invention relates to information processing systems and methods, and recording media.

2. Description of the Related Art

Some image forming apparatuses such as printers and multifunction peripherals installed in an office are set so as to be available only for users who have been given authority to operate the image forming apparatuses in advance. For example, there are image forming apparatuses that are available only for users who have registered accounts corresponding to the operation authority and are authenticated based on their accounts. Reference may be made to Japanese Laid-Open Patent Applications No. 2004-236348 and No. 2001-051915 for related art.

SUMMARY OF THE INVENTION

According to an aspect of the present invention, an information processing system, which includes one or more computers connected to an apparatus via a network, includes a reception part configured to receive a request addressed to a predetermined destination, a generation part configured to generate authority identification information for identifying operation authority to operate the apparatus, in response to reception of the request, a storage part configured to store the authority identification information generated by the generation part, and a transmission part configured to transmit the authority identification information to the transmission source of the request. The apparatus is configured to limit a value settable with respect to a setting related to a function of the apparatus, when the authority identification information stored in the storage part is input to the apparatus.

According to an aspect of the present invention, an information processing method includes receiving a request addressed to a predetermined destination, generating authority identification information for identifying operation authority to operate an apparatus, in response to reception of the request, storing the authority identification information generated by the generating, transmitting the authority identification information to the transmission source of the request, and limiting a value settable with respect to a setting related to a function of the apparatus, when the authority identification information stored in the storage part is input to the apparatus. An information processing system including one or more computers and connected to the apparatus via a network executes the above-described receiving, generating, storing and transmitting, and the apparatus executes the above-described limiting.

According to an aspect of the present invention, a non-transitory computer-readable recording medium has an executable program recorded thereon, wherein the program instructs a computer connected to an apparatus via a network and the apparatus to execute a process that includes receiving, by the computer, a request addressed to a predetermined destination, generating, by the computer, authority identification information for identifying operation authority to operate an apparatus, in response to reception of the request, storing, by the computer, the authority identification information generated by the generating, transmitting, by the computer, the authority identification information to the transmission source of the request, and limiting, by the apparatus, a value settable with respect to a setting related to a function of the apparatus, when the authority identification information stored in the storage part is input to the apparatus.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating a configuration of a user information storage part according to the first embodiment;

FIG. 7 is a diagram illustrating a configuration of a print information storage part according to the first embodiment;

FIG. 8 is a diagram illustrating a configuration of a PIN code storage part according to the first embodiment;

FIG. 14 is a diagram illustrating a configuration of a PIN code storage part according to the second embodiment.

DETAILED DESCRIPTION OF THE PREFERRED EMBODIMENTS

As mentioned above, there are image forming apparatuses that are available only for users authenticated based on their registered accounts. It is difficult, however, for guest users who do not have pre-registered accounts, such as visitors in the office, to use such image forming apparatuses. In response to this, for example, a guest account may be prepared and each guest user may log on using the common guest account. In this case, however, it is difficult to ensure security between guest users.

According to an aspect of the present invention, it is possible even for users who have not been given operation authority in advance to use apparatuses.

Figure 1:
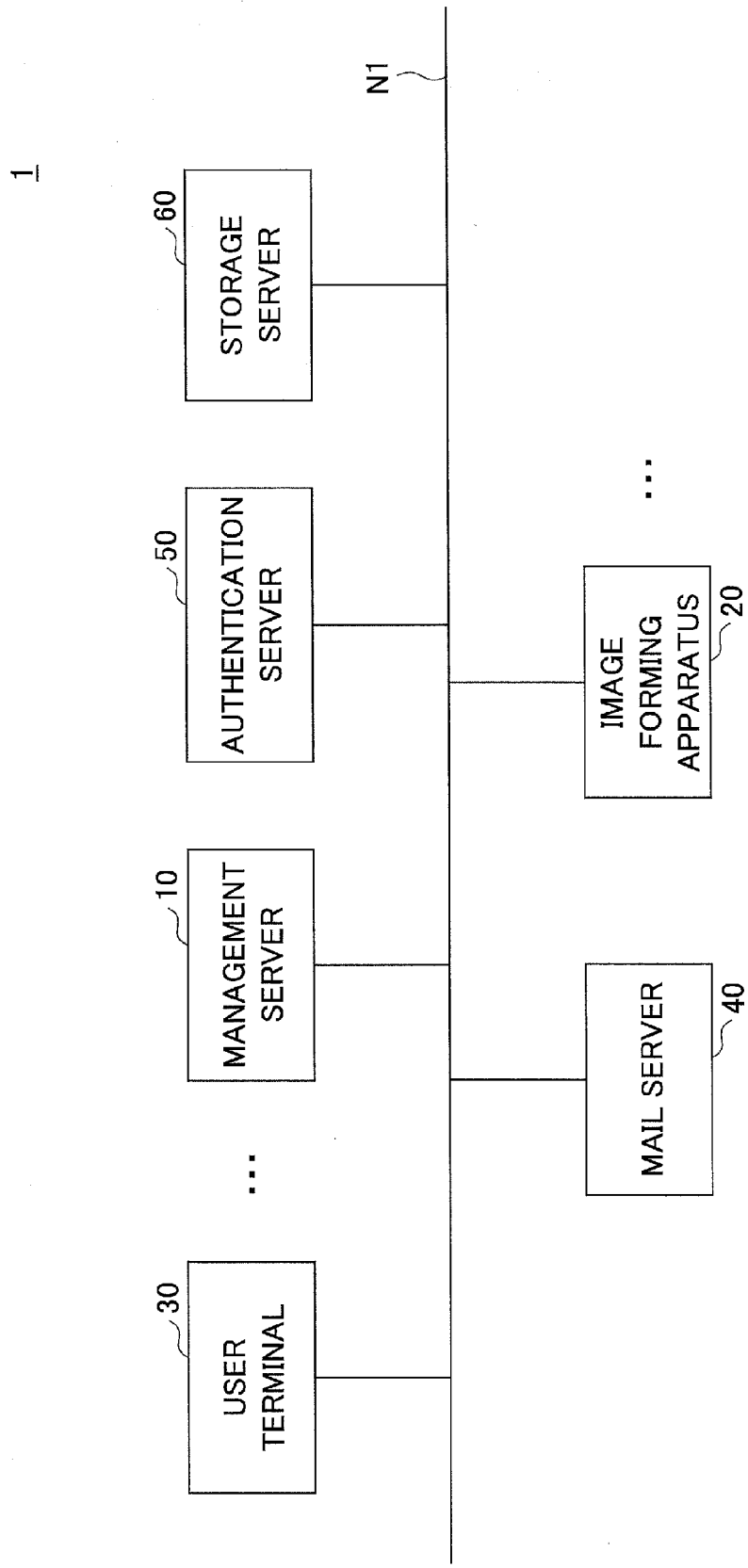
FIG. 1 is a diagram illustrating a configuration of an information processing system according to a first embodiment.

A description is given below, with reference to the accompanying drawings, of embodiments of the present invention. FIG. 1 is a diagram illustrating a configuration of an information processing system according to a first embodiment. Referring to FIG. 1, an information processing system 1 includes at least one user terminal 30, a mail server 40, a management server 10, an authentication server 50, a storage server 60, and at least one image forming apparatus 20, all of which are interconnected by a network N1 such as a local area network (LAN) or the Internet so as to be able to communicate with one another. The network N1 may be partly or entirely a wireless communications network. Further, there may be a mobile communication network between the user terminal 30 and the network N1. It is assumed that the information processing system 1 is operated in an organization such as a company. In the first embodiment, this organization is referred to as "Company A."

The user terminal 30 is an information processing apparatus directly operated by a user of the information processing system 1. For example, the user operates the user terminal 30 to input a request (print request) to the information processing system 1 for printing. Examples of the user terminal 30 include personal computers (PCs), cellular phones, smartphones, tablet terminals, and personal digital assistants (PDAs). In the case where there are two or more user terminals 30, the user terminals 30 may be different in machine type from each other.

In this embodiment, users of the information processing system 1 are divided into "authorized users" and "guest users." Authorized users are users who have been given authority to operate the image forming apparatus 20 in advance. That is, authorized users are those who are predetermined as users of the information processing system 1. Examples of authorized users include employees of Company A. Guest users are users who are not given authority to operate the image forming apparatus 20. Examples of guest users include those other than employees of Company A, such as visitors to Company A. In the information processing system 1, the distinction between authorized users and guest users is made based on whether an account corresponding to the authority to operate the image forming apparatus 20 is registered (technically speaking, with user information storage part 52 described below). The user terminal 30 may be an information processing apparatus privately owned by an authorized user or a guest user.

The mail server 40 is a computer that transfers an electronic mail (email) message transmitted from the user terminal 30 and an email message transmitted from the management server 10. For example, in response to a user's command, the user terminal 30 transmits an email message including a print request to the management server 10. The electronic data of an object of printing are attached to the email message including a print request. The data format of the electronic data is not limited to a predetermined format. The email message including a print request transmitted from the user terminal 30 is hereinafter referred to as "print request email message." Furthermore, in response to a user's command, the user terminal 30 transmits an email message that indicates a request for issuance of a personal identification number (PIN) code (hereinafter referred to as "PIN request email message") to the management server 10. In this embodiment, the PIN code is an example of temporary or quasi identification information corresponding to authority to operate the image forming apparatus 20 that substitutes for a username and a password to make the image forming apparatus 20 temporarily available.

The authentication server 50 is a computer that manages information on each authorized user including the username, password, and email address of the authorized user (hereinafter referred to as "user information"). For example, the authentication server 50 executes an authentication process in response to an authentication request in which a username and a password are specified. Furthermore, the authentication server 50 executes a process corresponding to an email address existence determination request for the determination of the existence of an email address and a process corresponding to a username obtaining request for the obtaining of a username corresponding to an email address.

The management server 10 is a computer or a computer system including one or more computers that issues a PIN code in response to reception of a PIN request email message. Furthermore, the management server 10 generates print data with respect to the electronic data attached to a print request email message (hereinafter also referred to as "data attachment") in response to the reception of the print request email message. The print data have a data format interpretable by the image forming apparatus 20. The management server 10 associates the generated print data with the username of a user who is a source (a transmitter) of the print request email message or with a PIN code, and transmits the generated print data associated with the username or PIN code to the storage server 60. When the source address of the print request email message is managed in correlation with a username by the authentication server 50, the print data are associated with the username. When the source address of the print request email message is not managed in correlation with a username by the authentication server 50, the management server 10 issues a PIN code. When a PIN code is issued, the print data are associated with the PIN code instead of a username.

The storage server 60 is a computer that stores print data transmitted from the management server 10.

The image forming apparatus 20 is an apparatus that executes a job related to scanning, a job related to copying, a job related to printing, and a job related to facsimile (FAX) transmission and reception. An apparatus that does not execute one or more of these jobs may also be used as the image forming apparatus 20. The image forming apparatus 20 executes a job requested by a user when authentication based on the username and password or the PIN code input by the user succeeds. For example, the image forming apparatus 20 prints print data associated with the username or PIN code input by an authenticated user among the print data stored in the storage server 60.

The management server 10, the authentication server 50, and the storage server 60 may be implemented by a single server, or the number of servers implementing (constituting)

the management server 10, the authentication server 50, and the storage server 60 may be suitably determined depending on operations.

Figure 2:
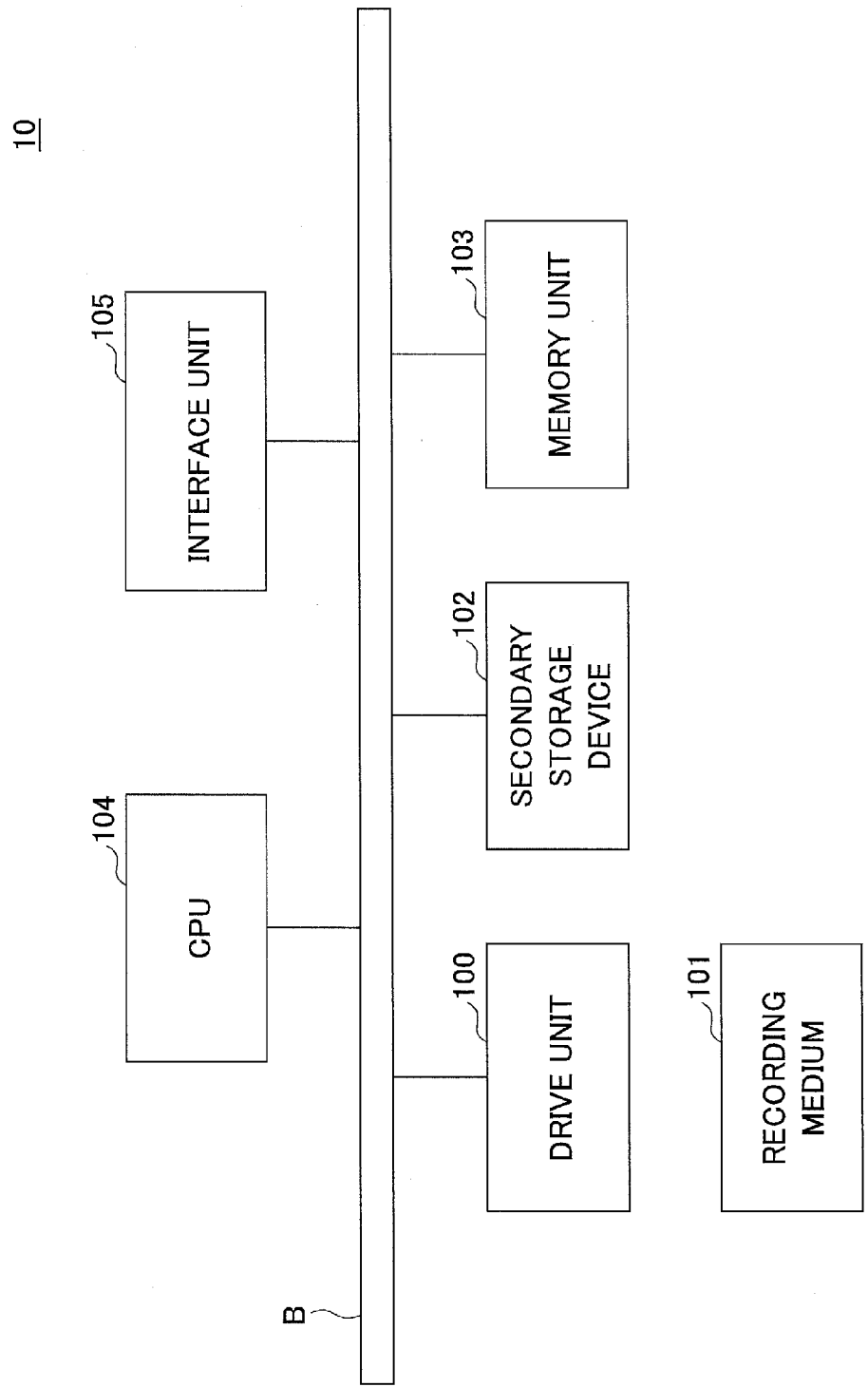
FIG. 2 is a diagram illustrating a hardware configuration of a management server according to the first embodiment.

FIG. 2 is a diagram illustrating a hardware configuration of a management server according to the first embodiment. Referring to FIG. 2, the management server 10 includes a drive unit 100, a secondary storage device 102, a memory unit 103, a central processing unit (CPU) 104, and an interface unit 105, all of which are interconnected by a bus B.

A program that implements processes in the management server 10 is provided by way of a recording medium 101 such as a CD-ROM. When the recording medium 101 storing the program is loaded in the drive unit 100, the program is installed in the secondary storage device 102 from the recording medium 101 via the drive unit 100. The program, however, does not always have to be installed from the recording medium 101, and may alternatively be downloaded from another computer via a network. The secondary storage device 102 stores files and data as well as installed programs.

The memory unit 103, in response to a command to activate a program, reads the program from the secondary storage device 102 and stores the read program. The CPU 104 executes functions pertaining to the management server 10 in accordance with a program stored in the memory unit 103. The interface unit 105 is used as an interface for connecting to a network.

Figure 3:
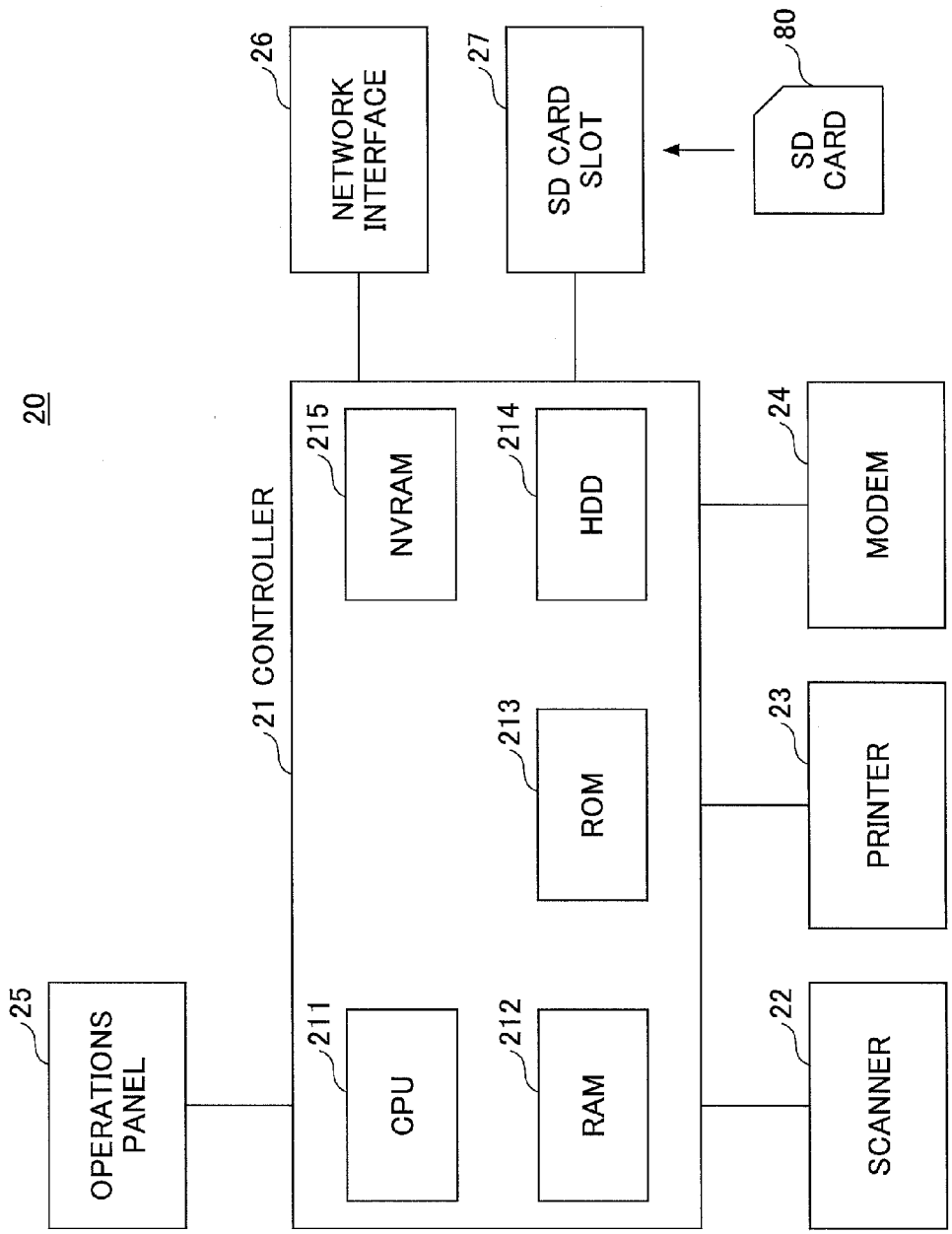
FIG. 3 is a diagram illustrating a hardware configuration of an image forming apparatus according to the first embodiment.

FIG. 3 is a diagram illustrating a hardware configuration of an image forming apparatus according to the first embodiment. Referring to FIG. 3, the image forming apparatus 20 includes hardware items including a controller 21, a scanner 22, a printer 23, a modem 24, an operations panel 25, a network interface 26, and an SD card slot 27.

The controller 21 includes a CPU 211, a random access memory (RAM) 212, a read-only memory (ROM) 213, a hard disk drive (HDD) 214, and a nonvolatile RAM (NVRAM) 215. The ROM 213 contains various programs and data used by the programs. The RAM 212 is used as a storage area for loading a program and as a work area for the loaded program. The CPU 211 implements various functions by executing a program loaded into the RAM 212. The HDD 214 contains programs and various data used by the programs. The NVRAM 215 contains various kinds of configuration information.

The scanner 22 is a hardware item (an image reading part) that reads image data from an original material. The printer 23 is a hardware item (a printing part) that prints print data on a recording medium such as printing paper. The modem 24 is a hardware item for connecting to a telephone line, and is used for transmission and reception of image data through facsimile communications.

The operations panel 25 is a hardware item that includes an input part for receiving a user's input, such as a button, and a display part such as a liquid crystal panel. The liquid crystal panel may have a touchscreen panel function. In this case, the liquid crystal panel also has the function of the input part. The network interface 26 is a hardware item for connecting to a network (either wired or wireless) such as a LAN.

The SD card slot 27 is used to read a program stored in an SD card 80. That is, according to the image forming apparatus 20, not only a program stored in the ROM 213 but also a program stored in the SD card 80 may be loaded into the RAM 212 and executed. The SD card 80 may be replaced with other recording media (such as a CD-ROM and a universal serial bus (USB) memory). That is, a recording medium corresponding to the position of the SD card 80 is not limited to a predetermined kind. In this case, the SD card slot 27 may be replaced with a hardware item corresponding to the kind of recording medium that replaces the SD card 80.

Figure 4:
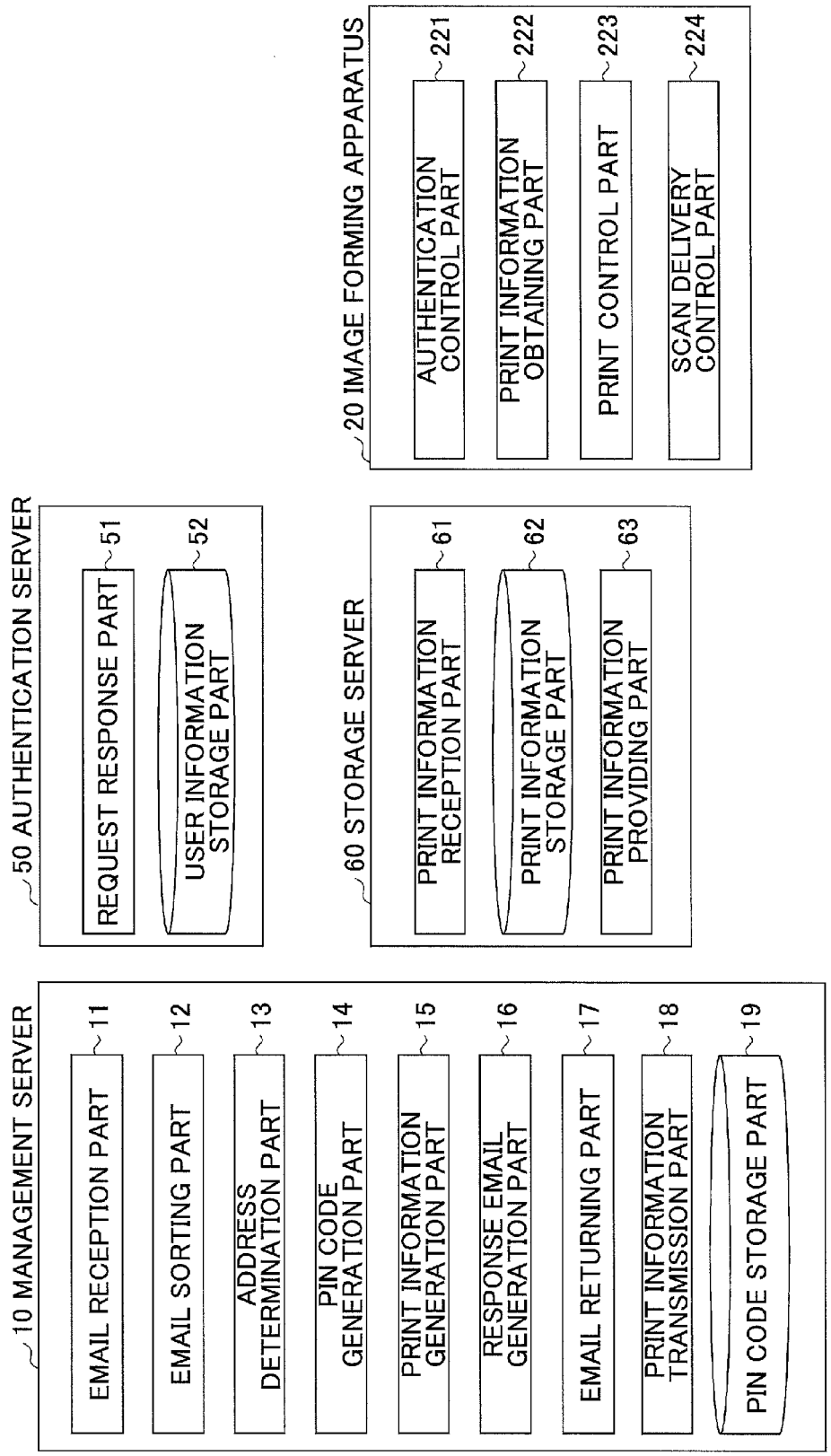
FIG. 4 is a diagram illustrating a functional configuration of an information processing system according to the first embodiment.

FIG. 4 is a diagram illustrating a functional configuration of an information processing system according to the first embodiment. Referring to FIG. 4, the management server 10 includes an email reception part 11, an email sorting part 12, an address determination part 13, a PIN code generation part 14, a print information generation part 15, a response email generation part 16, an email returning part 17, and a print information transmission part 18, all of which are implemented by processing that the CPU 104 is caused to execute by one or more programs installed in the management server 10.

Furthermore, the management server 10 uses a PIN code storage part 19. The PIN code storage part 19 may be implemented using the secondary storage device 102 (FIG. 2) or a storage device connected to the management server 10 via a network.

The email reception part 11 receives a PIN request email message or a print request email message from the mail server 40. The destination addresses of the PIN request email message and the print request email message are predetermined. Accordingly, the email reception part 11 receives an email message to a predetermined address as a PIN request email message or a print request email message. In the first embodiment, it is assumed that the PIN request email message and the print request email message have a common destination address.

The PIN request email message and the print request email message transmitted by a guest user need to include an email address stored in the user information storage part 52 with respect to any of the authorized users (hereinafter referred to as "authorized address"). For example, a guest user may be notified of an authorized address by an authorized user who has authorized the guest user to use the image forming apparatus 20. For example, the authorized address may be specified in the CC (carbon copy) address or BCC (blind carbon copy) address or included in the title (subject) or text of the PIN request email message or the print request email message.

The email sorting part 12 determines the purpose of an email message received by the email reception part 11. For example, the email sorting part 12 determines whether the email message is a PIN request email message or a print request email message.

The address determination part 13 transmits, to the authentication server 50, a request (an email address existence determination request) to determine the existence of the source address of a PIN request email message or a print request email message or the existence of an authorized address included in a PIN request email message or a print request email message. As a result, it is determined whether or not the source address or the authorized address is registered with the authentication server 50. If the source address or the authorized address is registered with the authentication server 50, the address determination part 13 obtains a username corresponding to the address from the authentication server 50.

The PIN code generation part 14 generates a PIN code when a transmitter of a PIN request email message is authorized to be given authority to operate the image forming apparatus 20. Furthermore, the PIN code generation part 14 generates a PIN code when a transmitter of a print request email message whose source address is not an authorized address is authorized to be given authority to operate the image forming apparatus 20. No PIN code is generated in response to a print request email message whose source address is an authorized address. This is because a transmitter of such a print request email message is an authorized user and has already had authority to operate the image forming apparatus 20.

The print information generation part 15 generates print information corresponding to a print request email message. The print information includes a username or a PIN code in addition to information on print data and a print job for the print data.

The response email generation part 16 generates an email message as a response to a PIN request email message or a print request email message (hereinafter referred to as "response email message"). The response email message responding to a PIN request email message includes an issued PIN code. The response email message responding to a print request email message includes the identification information of a print job based on individual print data. When a PIN code is generated in response to a print request email message, the response email message includes the generated PIN code.

The email returning part 17 returns a response email message to the source address of a PIN request email message or a print request email message. The print information transmission part 18 stores print information in the storage server 60 by transmitting the print information to the storage server 60. The PIN code storage part 19 stores a PIN code generated by the PIN code generation part 14 in correlation with the source address of a PIN request email message or a print request email message.

The authentication server 50 includes a request response part 51 and the user information storage part 52. The user information storage part 52 stores the user information of each authorized user. The request response part 51 executes processes corresponding to an authentication request, an email address existence determination request, and a request to obtain a username corresponding to an email address. The request response part 51 is implemented by a process that the CPU of the authentication server 50 is caused to execute by a program installed in the authentication server 50. The user information storage part 52 may be implemented using a secondary storage device of the authentication server 50 or a storage device connected to the authentication server 50 via a network.

The storage server 60 includes a print information reception part 61, a print information storage part 62, and a print information providing part 63. The print information reception part 61 receives print information transmitted from the management server 10 and stores the received print information in the print information storage part 62. The print information providing part 63, in response to a request to obtain print information from the image forming apparatus 20, retrieves print information including a username or a PIN code specified in the obtaining request from among the print information stored (retained) in the print information storage part 62 and returns the retrieved print information to the image forming apparatus 20.

The print information reception part 61 and the print information providing part 63 are implemented by a process that the CPU of the storage server 60 is caused to execute by one or more programs installed in the storage server 60. The print information storage part 62 may be implemented using a secondary storage device of the storage server 60 or a storage device connected to the storage server 60 via a network.

The image forming apparatus 20 includes an authentication control part 221, a print information obtaining part 222, a print control part 223, and a scan delivery control part 224, all of which are implemented by a process that the CPU 211 (FIG. 3) is caused to execute by one or more programs installed in the image forming apparatus 20.

The authentication control part 221 receives a user's input of a username and a password or a user's input of a PIN code. When a username and a password are input (entered), the authentication control part 221 requests the authentication server 50 to perform authentication based on the input username and password. When a PIN code is input, the authentication control part 221 determines whether the PIN code is stored in the PIN code storage part 19. The print information obtaining part 222 transmits a request to obtain print information to the storage server 60. In the obtaining request, at least one of the username and the PIN code received by the authentication control part 221 is specified. The print control part 223 executes a printing process with respect to the print data obtained by the print information obtaining part 222. The scan delivery control part 224 controls a scan delivery job. The scan delivery job is a job that delivers or stores image data input by the image forming apparatus 20 (that is, image data read from an original material [hereinafter referred to as "scanned image"]) to or in a predetermined storage or the user terminal 30.

Figure 5:
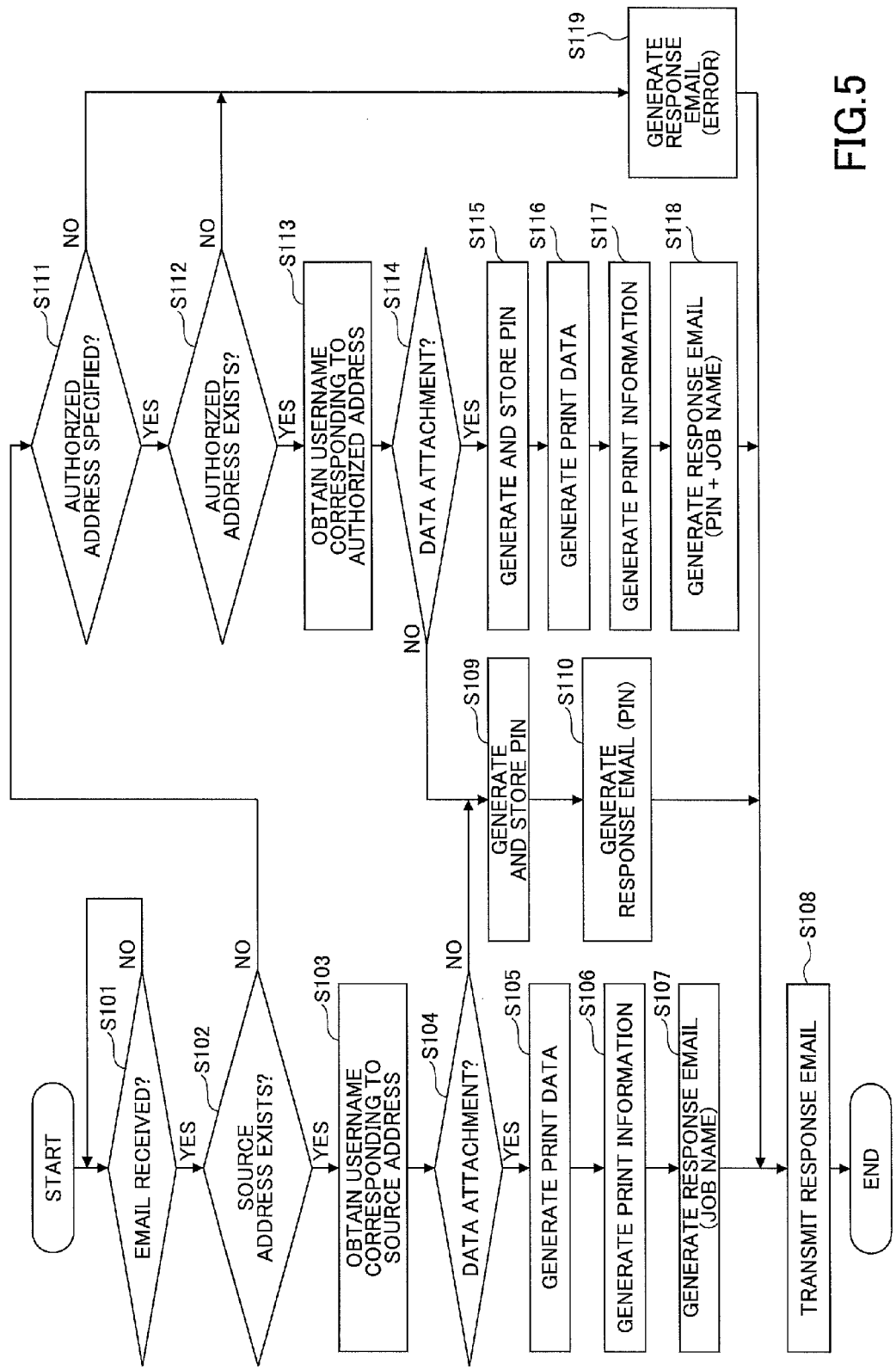
FIG. 5 is a flowchart for illustrating a procedure for a process executed by a management server in response to reception of an email message according to the first embodiment.

A description is given below of a procedure for a process executed in the information processing system 1. FIG. 5 is a flowchart for illustrating a procedure for a process executed by a management server in response to reception of an email message according to the first embodiment.

Referring to FIG. 5 as well as FIG. 4, at step S101, the email reception part 11 of the management server 10 waits for a PIN request email message or a print request email message to be received. That is, the email reception part 11 determines whether a PIN request email message or a print request email message has been received. For example, the email reception part 11 monitors reception of an email message to a predetermined address in the mail server 40 by polling. If such an email message has been received in the mail server 40 and obtained by the email reception part 11 (YES at step S101), at step S102, the address determination part 13 determines whether the source address of the email message exists by transmitting a request to determine the existence of the source address to the authentication server 50. The request response part 51 of the authentication server 50 determines whether the email address specified in the existence determination request is included in the user information stored in the user information storage part 52 as the email address of any user information.

FIG. 6 is a diagram illustrating a configuration of a user information storage part according to the first embodiment. Referring to FIG. 6, the user information storage part 52 stores user information with respect to each authorized user. The user information includes, for example, a username, a password, and an email address (authorized address). Multiple authorized addresses such as those for a PC and a mobile terminal may be registered for a single user.

The request response part 51 returns a response including a determination result to the management server 10. The determination result is information indicating the presence (existence) or absence of the source address.

If the determination result indicates the existence of the source address (YES at step S102), at step S103, the address determination part 13 obtains a username corresponding to the source address of the email message from the authentication server 50. That is, the username correlated with the source address in the user information storage part 52 is obtained.

Next, at step S104, the email sorting part 12 determines the presence or absence of a data attachment to the email message. In the case of the presence of a data attachment (YES at step S104), it is highly likely that the email message is a print request email message from an authorized user. Therefore, at step S105, the print information generation part 15 generates the print data of the data attachment. If multiple data attachments are included, the print information generation part 15 generates the print data of each data attachment. Furthermore, if the data attachment is in an archive file format such as a zip format including multiple files, the print information generation part 15 decompresses the archive files and generates the print data of each decompressed file. Accordingly, multiple print data items (multiple print jobs) may be generated with respect to a single print request email message. Print data may be generated with respect to the text of the print request email message.

Next, at step S106, the print information generation part 15 generates print information with respect to each print data item and transmits the generated print information to the storage server 60. In response to reception of the print information, the print information reception part 61 of the storage server 60 stores the received print information in the print information storage part 62.

FIG. 7 is a diagram illustrating a configuration of a print information storage part according to the first embodiment. Referring to FIG. 7, the print information storage part 62 stores print information with respect to each print data item (print data by print data). The print information includes a job name, a user mode, print data, and a username or a PIN code.

The job name is the identification information of each print data item or each print job executed with respect to each print data item. The user mode is information indicating whether the source address of a print request email message is an authorized address. In this embodiment, the user mode indicates whether a user who is a requestor of printing (requesting user) is an authorized user or a guest user, where "U" indicates an authorized user and "G" indicates a guest user. The username is the username of a user who is responsible for a print job based on the print information. The responsible user refers to, for example, a user to cover the cost related to the print job (while the cost may actually be covered by a department to which the user belongs), a user to be recorded in association with a log in the case of outputting the print job, or, in an environment where the account of the number of output printed sheets of paper (such as the accumulated number of sheets of paper) is managed with respect to each authorized user, a user whose account with respect to the print job is to be subject to the increment of the number of output printed sheets of paper. The PIN code is a PIN code assigned to the requesting user when the requesting user is a guest user.

At step S106, the print information is generated with respect to each print data item, and a job name corresponding to each print data item is included in the corresponding print information. In the user mode of each print information item, "U" is set. Furthermore, the username obtained at step S103 is set in each print information item. This print information is transmitted to the storage server 60.

Next, at step S107, the response email generation part 16 generates a response email message in which the job name of each print information item is described in, for example, the text. Next, at step S108, the email returning part 17 transmits the response email message to the source address of the print request email message.

It is possible for a user who has read the response email message to know a job name corresponding to each print data item generated in response to the print request email message. In the case where the source address is present (stored) in the user information storage part 52, however, it is not always necessary to return a response email message. This is because it is possible for a user to understand the contents of print data corresponding to each job name at the below-described time of operating the image forming apparatus 20 when the job name is generated based on the filename or the like of electronic data, for example.

On the other hand, if it is determined at step S104 that there is no data attachment to the email message (NO at step S104), it is highly likely that the email message is a PIN request email message from an authorized user. Therefore, at step S109, the PIN code generation part 14 generates a PIN code that has a value different from those of the PIN codes that have already been issued, and stores the generated PIN code in the PIN code storage part 19 in correlation with the source address of the PIN request email message and the username of the authorized user obtained at step S103.

FIG. 8 is a diagram illustrating a configuration of a PIN code storage part according to the first embodiment. Referring to FIG. 8, the PIN code storage part 19 stores a generated PIN code in correlation with an email address and the username of an authorized user. The email address is the source address of an email message that has triggered the issuance of the PIN code. The username is the username of an authorized user pertaining to the email message. When the source address is an authorized address, the authorized user pertaining to the email message is an authorized user pertaining to the authorized address. When the source address is not an authorized address, the authorized user pertaining to the email message is an authorized user pertaining to an authorized address separately specified in the email message.

In the first embodiment, a PIN code that is newly generated may be generated by any method as long as the newly generated PIN code has a value different from those of the PIN codes that have already been issued (that is, the PIN codes stored in the PIN code storage part 19). It is desirable, however, that PIN codes be composed of characters that may be easily input through the operations panel 25 (FIG. 3) of the image forming apparatus 20 or software keyboards displayed on the operations panel 25.

Next, at step S110, the response email generation part 16 generates a response email message in which the generated PIN code is described in the text, for example. The response email message is transmitted to the source address of the PIN request email message at step S108. It is possible for the authorized user who has read the response email message to know a PIN code that is required to be input to the image forming apparatus 20 when it is desired to perform, for example, copying or scanning. For example, a PIN code may be issued to an authorized user who has operation authority (to operate the image forming apparatus 20) when the authorized user has the PIN code issued for a guest user who is a visitor to the authorized user. In this case, the authorized user notifies the guest user of the issued PIN code. As described below, the guest user may log on to the image forming apparatus 20 using the PIN code.

On the other hand, if the source address does not exist at step S102 (NO at step S102), at step S111, the address determination part 13 determines whether an authorized address is specified in the email message. For example, the address determination part 13 determines whether or not an authorized address is specified in the CC address, BCC address, title or text of the email message. It may be suitably determined how an authorized address should be specified.

If an authorized address is specified in the email message (YES at step S111), at step S112, the address determination part 13 determines the presence (existence) or absence of the authorized address in the same manner as at step S102. If the authorized address exists (YES at step S112), at step S113, the address determination part 13 obtains the username of an authorized user corresponding to the authorized address in the same manner as at step S103.

Next, at step S114, the email sorting part 12 determines the presence or absence of a data attachment to the received email message. In the case of the presence of a data attachment (YES at S114), it is highly likely that the email message is a print request email message from a guest user. Therefore, at step S115, the PIN code generation part 14 generates a PIN code in the same manner as at step S109. The PIN code generation part 14 stores the generated PIN code in the PIN code storage part 19 (FIG. 8) in correlation with the source address of the print request email message and the username of the authorized user obtained at step S113.

Next, the print information generation part 15 generates print data at step S116 in the same manner as at step S105, and generates and transmits print information to the storage server 60 at step S117 in the same manner as at step S106. In the user mode of each print information item generated at step S117, however, "G" is set. Furthermore, in each print information item, the username of the authorized user obtained at step S113 and the PIN code generated at step S115 are set. For example, in FIG. 7, the first record is an example of print information generated at step S117.

Next, at step S118, the response email generation part 16 generates a response email message in which the PIN code as well as the job name of each print information item is described in the text, for example. The response email message is transmitted to the source address of the print request email message at step S108. It is possible for the guest user who has read the response email message to know a PIN code that is required to be input to the image forming apparatus 20 at the time of printing the print data generated in response to the print request email message. Furthermore, it is possible for the user to know a job name corresponding to each print data item. The job name, however, does not necessarily have to be included in the response email message.

On the other hand, if it is determined at step S114 that there is no data attachment to the email message (NO at step S114), it is highly likely that the email message is a PIN request email message from a guest user. Therefore, in this case, steps S109 and S110 described above are executed. That is, a PIN code is issued to the guest user. It is possible for the guest user to log on to the image forming apparatus 20 using the issued PIN code as described below.

Furthermore, if no authorized address is specified in the print request email message from the guest user (NO at step S111) or if the email address specified as an authorized address is not an authorized address (NO at step S112), at step S119, the response email generation part 16 generates, for example, a response email message including an error message (hereinafter referred to as "error email message"). In this case, the error email message is transmitted at step S108.

A response email message including a PIN code may include the expiration date of the PIN code. This makes it possible for a user to know the expiration date of the issued PIN code.

An authorized address is specified with respect to email messages whose source address is not an authorized address in order to prevent unauthorized use of the image forming apparatus 20 by a guest user and to clarify a billing destination with respect to usage of the image forming apparatus 20 by a guest user. For example, when an authorized address is specified in the CC address or BCC address of an email message whose source address is not an authorized address, it is possible for the authorized user to instantaneously know that a print request email message or a PIN request email message has been transmitted by a guest user. Accordingly, it is possible to detect the occurrence of a print request email message or a PIN request email message that is not intended by the authorized user. As a result, it is possible to prevent unauthorized use by a guest user. An authorized address may be specified together with the destination address of a print request email message or a PIN request email message in the destination address ("To" box) in place of the CC address or BCC address.

Furthermore, when it is necessary to have an authorized address specified in the title or text, the management server 10 may, for example, transfer a print request email message or a PIN request email message to the authorized address. By doing so, it is also possible to obtain the same effect as in the case of specifying an authorized address in the CC address or BCC address.

Furthermore, specifying an authorized address with respect to an email message whose source address is not an authorized address makes it possible to associate a PIN code generated based on the email message with the authorized user. In this embodiment, such association is retained in the PIN code storage part 19. Based on the association of the PIN code and the authorized user, it is possible to associate, with the authorized user, a job executed by the image forming apparatus 20 that has been logged on to using the PIN code. Accordingly, for example, it is possible to make it possible to identify an authorized user who is a billing destination with respect to a job that a guest user has caused the image forming apparatus 20 to execute.

The specification of an authorized address, however, may be omitted with respect to email messages from guest users depending on the required level of security. In this case, there may be no execution of steps S112 and S113.

Next, a description is given of a procedure for a process executed by the image forming apparatus 20 in accordance with a user's operation of the image forming apparatus 20.

Figure 9:
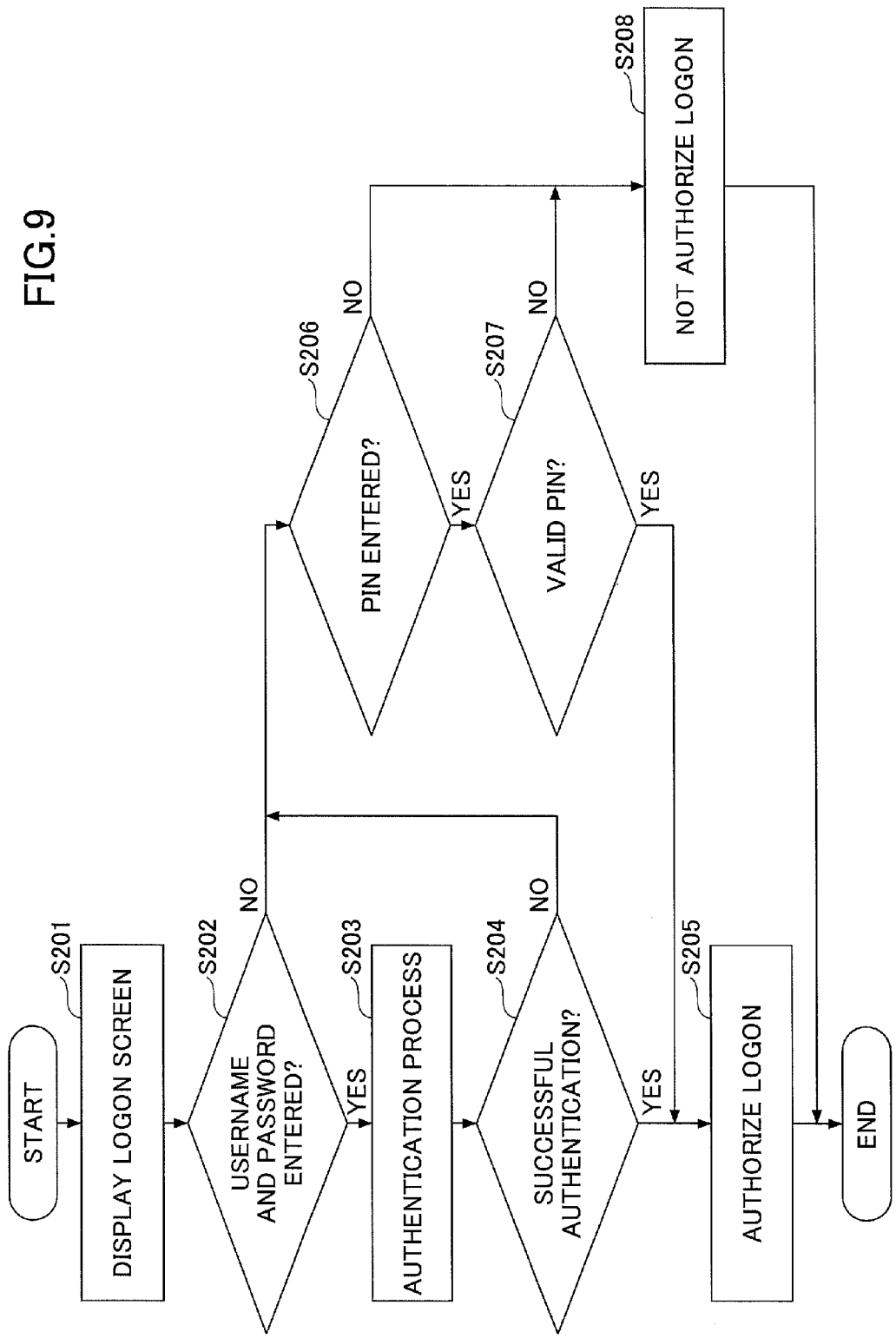
FIG. 9 is a flowchart for illustrating a procedure for a process for logging on to an image forming apparatus according to the first embodiment.

FIG. 9 is a flowchart for illustrating a procedure for a process for logging on to an image forming apparatus according to the first embodiment.

Referring to FIG. 9 as well as FIG. 4, at step S201, after activation of the image forming apparatus 20 or after the logoff of another user, the authentication control part 221 causes a logon screen to be displayed on the operations panel 25 (FIG. 3).

Figure 10:
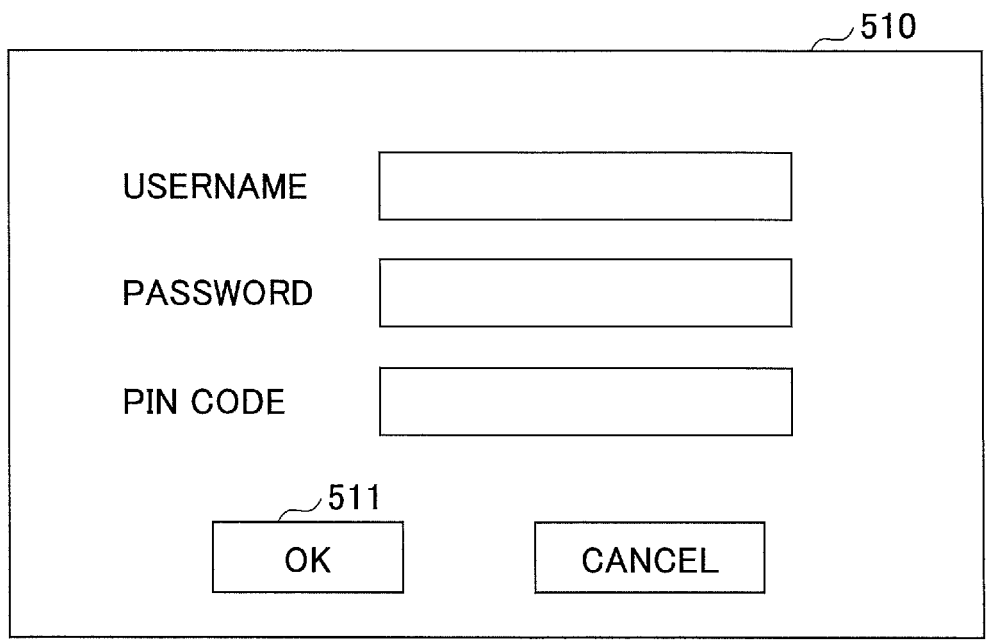
FIG. 10 is a diagram illustrating a display example of a logon screen.

FIG. 10 is a diagram illustrating a display example of a logon screen. Referring to FIG. 10, a logon screen 510 includes fields for entering a username, a password, and a PIN code.

For example, when an operator of the image forming apparatus 20 is an authorized user, a username and a password are entered on the logon screen 510. On the other hand, when the operator is a guest user, a PIN code of which the operator has been notified by a response email message or a PIN code of which the operator has been notified by an authorized user is entered on the logon screen 510.

The authorized user also may enter a PIN code. For example, when the authorized user transmits a print request email message from the email address of the user terminal 30 for private use, that is, from an email address that is not an authorized address, a response email message returned to the user terminal 30 includes a PIN code. Meanwhile, the authorized user may have separately transmitted a print request email message from an authorized address. In this case, with respect to the authorized user, print data associated with the PIN code and print data associated with the username are stored in the storage server 60. In order to enable a printing process to be executed for both print data by a single logon operation, the username and password and the PIN code may be simultaneously entered.

When at least either a username and password or a PIN code is entered on the logon screen 510 and an OK button 511 is depressed, at step S202, the authentication control part 221 determines whether a username and password are entered on the logon screen 510. If a username and password are entered (YES at step S202), at step S303, the authentication control part 221 performs authentication. For example, the authentication control part 221 transmits an authentication request in which the entered username and password are specified to the authentication server 50.

The request response part 51 of the authentication server 50 determines whether the combination of the username and password specified in the authentication request is stored in the user information storage part 52. If the combination is stored in the user information storage part 52, the authentication succeeds. If the combination is not stored in the user information storage part 52, the authentication fails. The request response part 51 returns information indicating the success or failure of the authentication to the authentication control part 221 of the image forming apparatus 20, which has requested the authentication.

If it is determined at step S204 that the authentication has succeeded (YES at step S204), at step S205, the authentication control part 221 authorizes the operator to log on, and stores the entered username in, for example, the RAM 212 (FIG. 3) as logon information. Furthermore, if a PIN code has been entered along with the username and password with which the authentication has succeeded, the PIN code also is included in the logon information and stored in the RAM 212. In this case, the operator is enabled to cause the image forming apparatus 20 to execute, for example, scanning, copying, facsimile transmission or a print job based on print information stored in the storage server 60 within authority corresponding to the entered username.

On the other hand, if a username and password are not entered on the logon screen 510 (NO at step S202) or if the authentication based on the username and password fails (NO at step S204), at step S206, the authentication control part 221 determines whether a PIN code is entered on the logon screen 510. If a PIN code is entered (YES at step S206), at step S207, the authentication control part 221 determines the validity of the PIN code. For example, if the PIN code is stored in the PIN code storage part 19, the PIN code is determined as being valid. If the PIN code is not stored in the PIN code storage part 19, the PIN code is determined as being invalid. In the case where a valid PIN code is stored in the PIN code storage part 19, the email address and the username of an authorized user stored in correlation with the PIN code are obtained from the PIN code storage part 19.

If the entered PIN code is valid (YES at step S207), at step S205, the authentication control part 221 authorizes the operator to log on, and stores the PIN code and the email address and the username of an authorized user correlated with the PIN code in, for example, the RAM 212 (FIG. 3) as logon information. In this case, the operator is enabled to cause the image forming apparatus 20 to execute, for example, scanning, copying, facsimile transmission or a print job based on print information stored in the storage server 60 within authority given to a guest user.

On the other hand, if the entered PIN code is invalid (NO at step S207), at step S208, the authentication control part 221 does not authorize the operator to log on. In this case, for example, the logon screen 510 remains displayed and the operator is prevented from using the image forming apparatus 20.

In the case where the image forming apparatus 20 executes a job in accordance with an operation by an operator who has successfully logged on, the image forming apparatus 20 may record logon information as part of log data. This makes it possible to identify a responsible authorized user with respect to each job. Furthermore, in the case where the operator is a guest user, by recording the email address of the guest user in log data, it is possible to expect a psychological deterrent effect over unauthorized use by a guest user and an increased possibility of tracking a guest user who has made unauthorized use of the image forming apparatus 20. The email address of a guest user, however, does not always have to be included in log data. In this case, the email address does not have to be stored in the PIN code storage part 19.

Next, a description is given of a procedure for a process executed by the image forming apparatus 20 when an operator authorized to log on gives an instruction to execute a scan delivery job.

Figure 11:
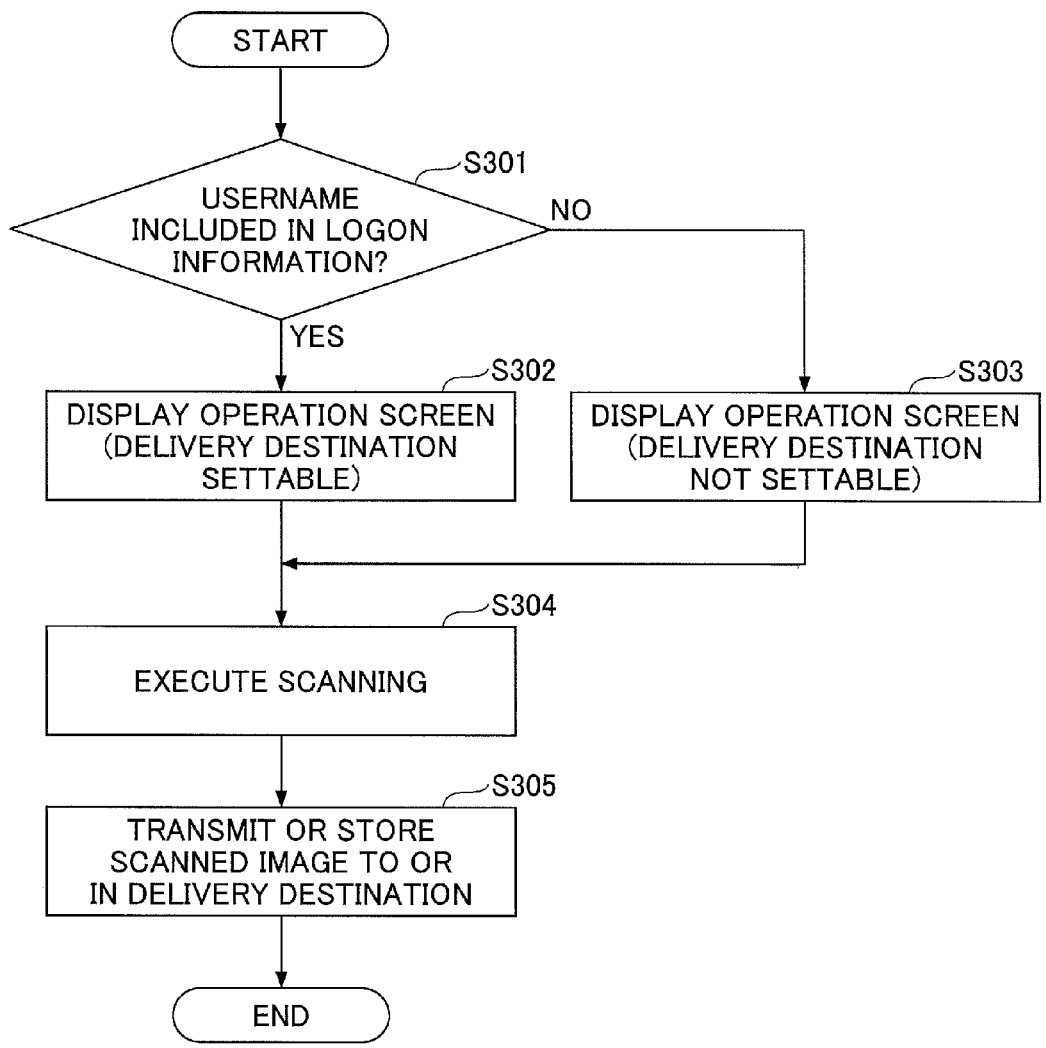
FIG. 11 is a flowchart for illustrating a procedure for a process for executing a scan delivery job according to the first embodiment.

FIG. 11 is a flowchart for illustrating a procedure for a process for executing a scan delivery job according to the first embodiment.

Referring to FIG. 11 as well as FIG. 4, at step S301, the scan delivery control part 224 determines whether a username is included in logon information. That is, it is determined whether the operator is an authorized user. If a username is included in logon information (that is, the operator is an authorized user) (YES at step S301), at step S302, the scan delivery control part 224 causes an operation screen for a scan delivery job to be displayed on the operations panel 25. On the operation screen, it is possible to set values with respect to scan-related settings such as resolution and color settings and delivery-related settings such as the selection of a delivery or storage destination of a scanned image.

When the setting operation through the operation screen is completed, and an original material is set and an instruction to start scanning is input, at step S304, the scan delivery control part 224 causes the scanner 22 (FIG. 3) to execute the scanning of the original material at a resolution, etc., according to the settings on the operation screen. Next, at step S305, the scan delivery control part 224 transmits or stores the scanned image to or in a delivery or storage destination set on the operation screen. The identification information of a predetermined delivery destination (hereinafter referred to as "delivery destination information") may be pre-stored authorized user by authorized user in, for example, the user information storage part 52. In this case, the delivery destination information may be included in logon information at the time of logon. If the delivery destination information is included in logon information, a delivery destination pertaining to the delivery destination information may be selected as a predetermined delivery destination on the operation screen displayed at step S302.

On the other hand, if no username is included in logon information (NO at step S301), at step S303, the scan delivery control part 224 causes an operation screen for a scan delivery job to be displayed on the operations panel 25. On the operation screen, values that may be set with respect to settings are limited. For example, a delivery destination is prevented from being set. The delivery destination is fixed to the email address included in logon information. Furthermore, selectable values (options) may be limited with respect to resolution and color settings. Alternatively, a single fixed setting value alone may be selected with respect to each setting.

When the setting operation through the operation screen is completed, and an original material is set and an instruction to start scanning is input, step S304 and step S305 are executed. In this case, the delivery destination is the email address included in logon information. Accordingly, the scanned image is delivered to, for example, the user terminal 30 of a guest user. Limiting the delivery destination makes it possible to prevent a scanned image by a guest user from being delivered to or stored in a delivery destination or a storage that should be accessible by only authorized users.

When the operator is a guest user, only a predetermined delivery destination (such as a storage) prepared for guest users may be determined as a delivery destination instead of the email address included in logon information. In this case, the response email message may include a link (such as a URL) to the delivery destination in order to allow the guest user to access a delivered scanned image. At the time of transmitting the response email message, the URL of a delivery destination is not determined because the scan delivery job has not been executed. However, for example, by providing the URL of a delivery destination with the regularity that a PIN code is included, it is possible to cause an accessible delivery destination to differ between guest users. Furthermore, because a PIN code is included in logon information, the scan delivery control part 224 may identify the URL of a delivery destination based on the PIN code and the regularity of the URL of a delivery destination, and may deliver a scanned image to a delivery destination corresponding to the URL.

Alternatively, it may be determined on the operation screen displayed at step S303 whether to select the email address or a predetermined delivery destination for guest users as a delivery destination.

In order to prevent, for example, unauthorized scanning and taking out of classified papers of Company A by a guest user, the scan delivery control part 224 may deliver a scanned image to an authorized address as well when the operator is a guest user. The authorized address may be obtained from the user information storage part 52 based on the username of an authorized user included in logon information.

Next, a description is given of a procedure for a process executed by the image forming apparatus 20 when an instruction to execute a print job based on print information stored in the storage server 60 is input by an operator authorized to log on.

Figure 12:
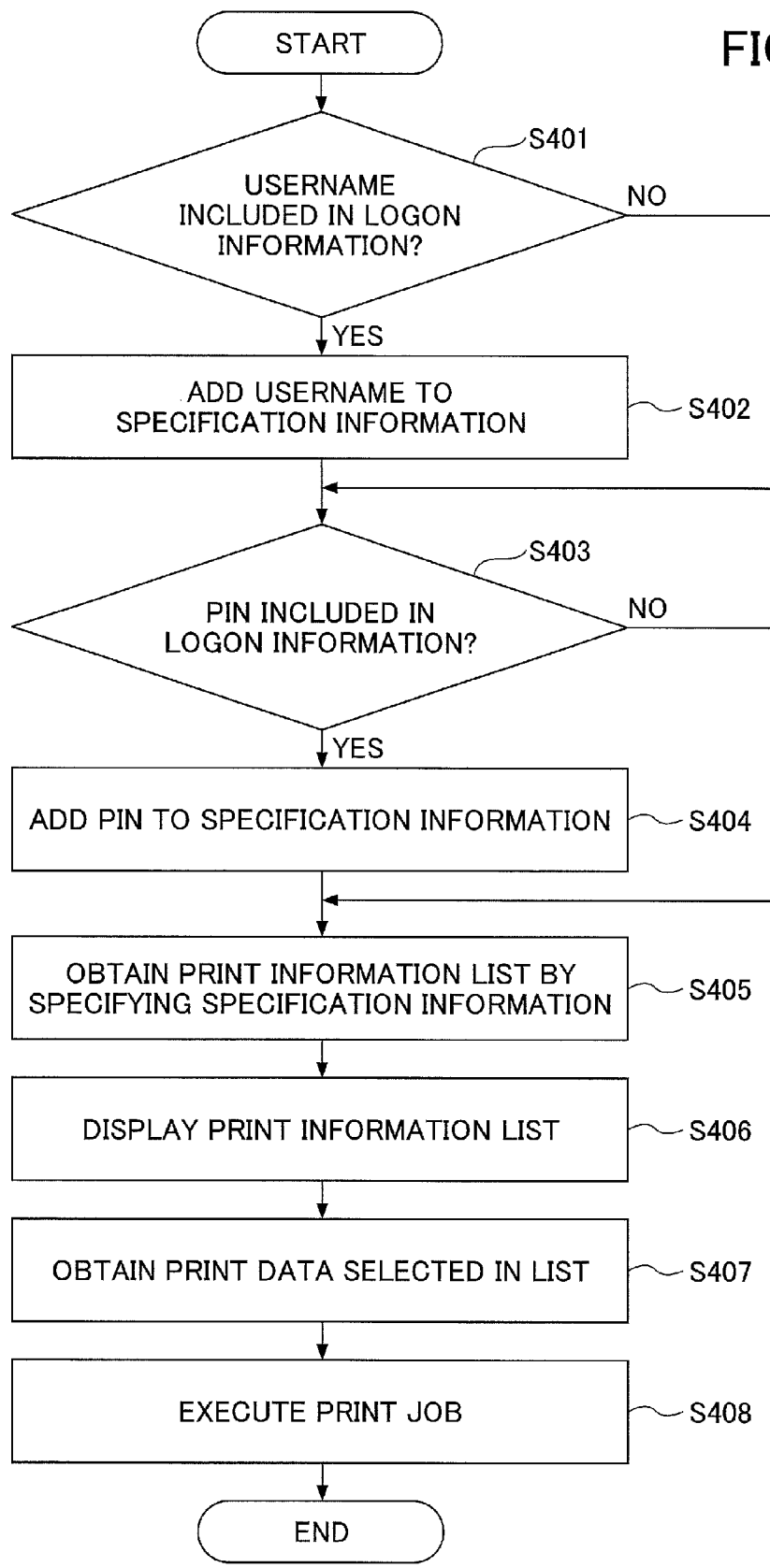
FIG. 12 is a flowchart for illustrating a procedure for a process for executing a print job based on print information stored in a storage server according to the first embodiment.

FIG. 12 is a flowchart for illustrating a procedure for a process for executing a print job based on print information stored in a storage server according to the first embodiment.

Referring to FIG. 12 as well as FIG. 4, at step S401, the print information obtaining part 222 determines whether a username is included in logon information. If a username is included in logon information (YES at step S401), at step S402, the print information obtaining part 222 adds the username to specification information. The specification information is information specified in obtaining a list of print information items from the storage server 60 at subsequent step S405.

Next, at step S403, the print information obtaining part 222 determines whether a PIN code is included in the logon information. If a PIN code is included in the print information (YES at step S403), at step S404, the print information obtaining part 222 adds the PIN code to the specification information.

Next, at step S405, the print information obtaining part 222 specifies the specification information and obtains a list of print information items from the storage server 60. To be more specific, the print information obtaining part 222 transmits a request to obtain a list of print information items, specifying the specification information, to the storage server 60. In response to the obtaining request, the print information providing part 63 of the storage server 60 obtains print information that includes the specification information specified in the obtaining request from the print information storage part 62 (FIG. 7). That is, when a username is included in the logon information, print information whose user mode is "U" and that includes the username is obtained. When a PIN code is included in the logon information, print information whose user mode is "G" and that includes the PIN code is obtained.

When a username and a PIN code are included in the logon information, print information whose user mode is "U" and that includes the username and print information whose user mode is "G" and that includes the PIN code are obtained.

The print information providing part 63 returns a list of the obtained print information items to the image forming apparatus 20. Print data do not have to be included in the returned print information.

Next, at step S406, the print information obtaining part 222 of the image forming apparatus 20 causes a list of the job names, etc., included in the returned print information to be displayed on the operations panel 25 (FIG. 3). The list is a list of candidate objects of printing. That is, it is possible for a user to input an instruction to execute printing with respect to the print information (items) included in the list.

If at least one job name is selected from the list, at step S407, the print information obtaining part 222 obtains print data corresponding to the job name from the storage server 60. To be more specific, the print information obtaining part 222 transmits a request to obtain print data in which the job name is specified to the storage server 60. In response to the obtaining request, the print information providing part 63 of the storage server 60 returns print data corresponding to the job name specified in the obtaining request to the image forming apparatus 20.

In the case where the print information of a single print data item alone is obtained by the username or PIN code included in the logon information, the print information obtaining part 222 may automatically obtain print data without executing the process of step S406. Furthermore, the print information providing part 63 may return print data obtained by the username or PIN code instead of returning a list of print information items to the image forming apparatus 20.

Next, at step S408, the print control part 223 controls execution of a print job related to the print data. As a result, paper on which the print data are printed is output.

As described above, according to the first embodiment, a guest user who does not have an account may be provided with a PIN code that is a temporary or quasi account. Furthermore, because the PIN code differs between guest users, it is possible to improve security between guest users compared with the case of sharing an account between guest users.

Next, a description is given of a second embodiment. In the second embodiment, differences from the first embodiment are illustrated. Accordingly, the second embodiment may be the same as the first embodiment with respect to the points not referred to in particular.

In the second embodiment, with respect to a PIN request email message from an authorized user, it is possible to specify the contents of operation authority desired to be obtained by a PIN code. The contents of operation authority refers to information that indicates which function(s) of the functions of the image forming apparatus 20 is (are) available. For example, the contents of operation authority (hereinafter referred to as "authority information") are specified in, for example, in the title or text of a PIN request email message in a format as follows:

auth=Print/Scan.

In the above-described example, it is indicated that operation authority is given for a print function and a scan function. In other words, operation authority is not given for a FAX function or a copy function, for example. The above-described format is an example. Accordingly, other formats may be adopted. Furthermore, the concept of "function" may be correlated with an application unit such as a print function or a scan function, or may be correlated with the settings of each application. That is, whether to give operation authority may be determined with respect to each setting of each function.

By thus making it possible to specify authority information in the PIN request email message, it is possible to limit operable functions with respect to usage of the image forming apparatus 20 based on a PIN code when an authorized user receives an issued PIN code on behalf of a guest user. As a result, it is possible to reduce the possibility of unauthorized use by a guest user.

Figure 13:
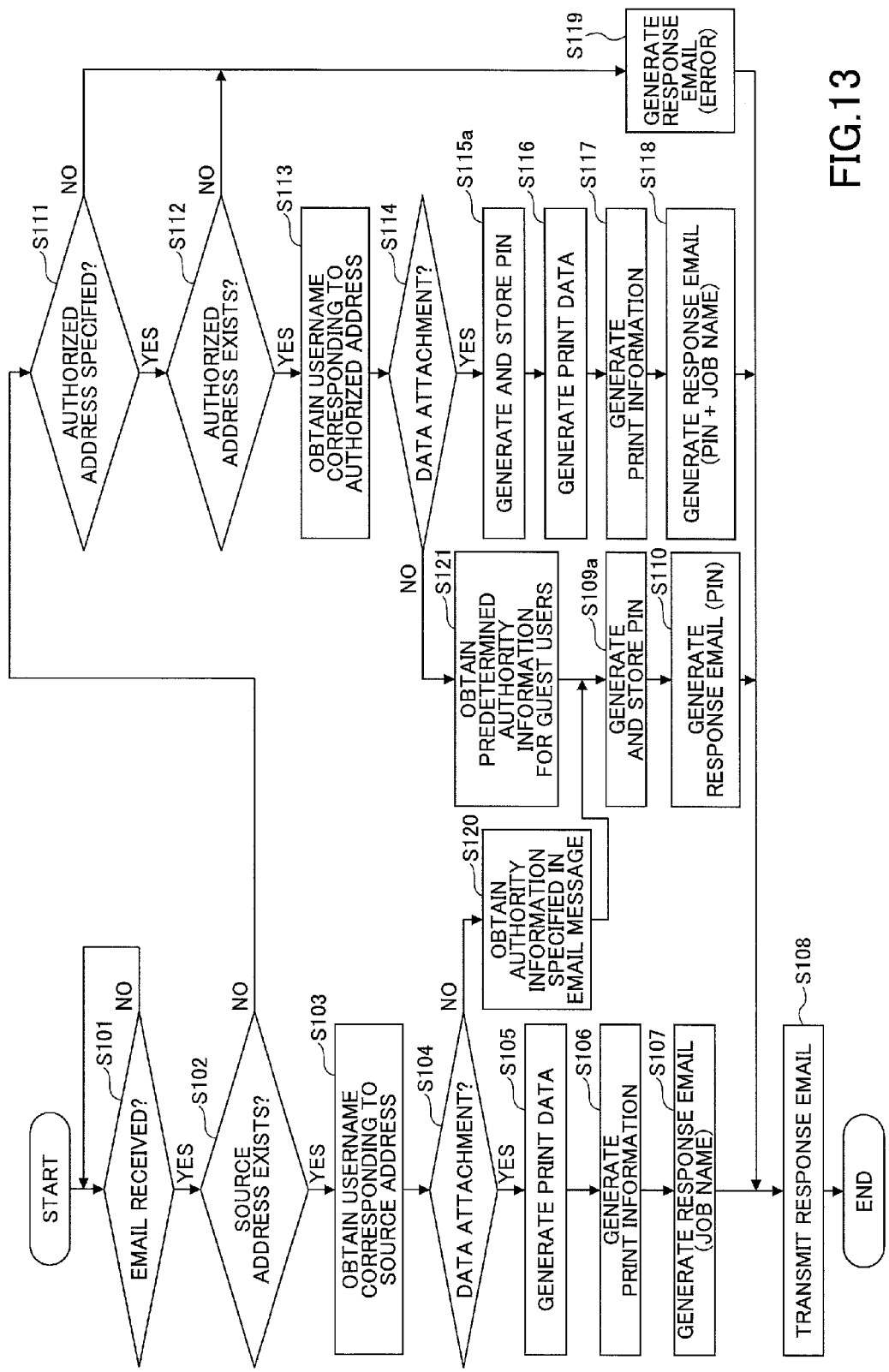
FIG. 13 is a flowchart for illustrating a procedure for a process executed by a management server in response to reception of an email message according to a second embodiment.

FIG. 13 is a flowchart for illustrating a procedure for a process executed by a management server in response to reception of an email message according to the second embodiment. In FIG. 13, the same steps as those of FIG. 5 are referred to by the same step numbers, and their description is omitted.

In FIG. 13, in the case of NO at step S104, step S120 is executed, and in the case of NO at step S114, step S121 is executed. That is, in the case of receiving a PIN request email message from an authorized user, step S120 is executed, and in the case of receiving a PIN request email message from a guest user, step S121 is executed. Furthermore, steps S109 and S115 of FIG. 5 are replaced with steps S109a and S115a.

Referring to FIG. 13 as well as FIG. 4, at step S120, the email sorting part 12 obtains authority information specified in a predetermined format from the subject or text of the PIN request email message.

At step S109a, the PIN code generation part 14 stores the obtained authority information in the PIN code storage part 19 in correlation with the generated PIN code.

FIG. 14 is a diagram illustrating a configuration of a PIN code storage part according to the second embodiment. As illustrated in FIG. 14, the authority information specified in a PIN request email message is stored in correlation with a PIN code, etc., in the PIN code storage part 19 of the second embodiment.

On the other hand, at step S121, the email sorting part 12 obtains predetermined authority information for guest users from, for example, the secondary storage device 102. Accordingly, in this case, at step S109a, the predetermined authority information for guest users is stored in the PIN code storage part 19 in correlation with the PIN code.

That is, according to this embodiment, it is impossible to specify authority information in PIN request email messages from guest users. This is because if guest users are allowed to specify authority information, the guest users may obtain unlimited operation authority. Depending on operations, however, authority information may be allowed to be specified in PIN request email messages from guest users. In this case, at step S121, the same process as at step S120 may be executed. Furthermore, at step S115a, "Print" that is the identification information of operation authority for a print job is stored in the PIN code storage part 19 in correlation with the PIN code. This is because it is considered sufficient if the PIN code issued in response to a print request email message is given operation authority for a print job based on the print request email message.

In the second embodiment, when the process of FIG. 9 is executed, at step S205 executed in the case of YES at step S207, the authority information stored in the PIN code storage part 19 in correlation with a PIN code pertaining to logon information is further included in the logon information.

Next, a description is given of a procedure for a process executed by the image forming apparatus 20 in response to selection of a function to be used by a guest user authorized to logon based on a PIN code by the process of FIG. 9.

Figure 15:
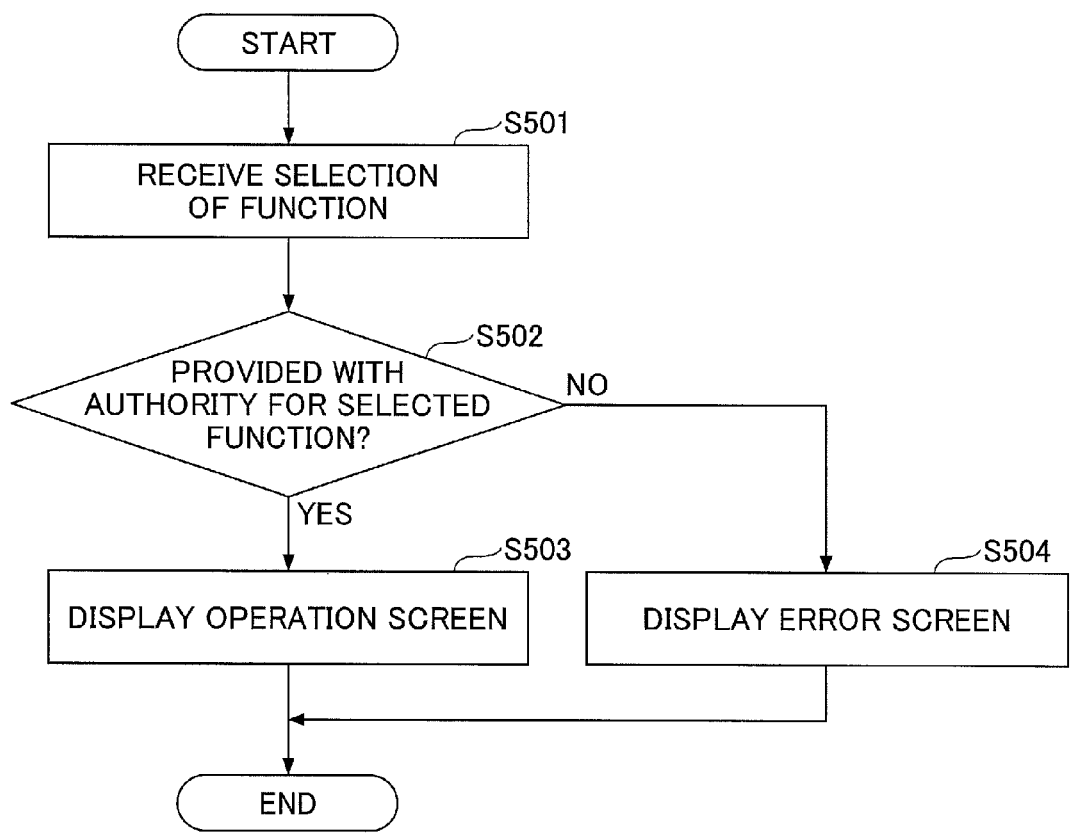
FIG. 15 is a flowchart for illustrating a procedure for a process executed by an image forming apparatus in response to selection of a function to be used.

FIG. 15 is a flowchart for illustrating a procedure for a process executed by an image forming apparatus in response to selection of a function to be used by a guest user. The process of FIG. 15 is based on the assumption that an operator of the image forming apparatus 20 is a guest user authorized to log on based on a PIN code. Common access control may be performed with respect to authorized users authorized to log on based on a username and password.

For example, immediately after a logon, a function selection screen on which the icons or buttons of functions are arranged is displayed on the operations panel 25 of the image forming apparatus 20.

Referring to FIG. 15 as well as FIG. 4, at step S501, the authentication control part 221 receives selection of a function through the function selection screen. Next, at step S502, the authentication control part 221 determines whether a user who has logged on (logon user) has operation authority for the selected function. This determination is performed based on, for example, authority information included in logon information. For example, if the identification information of the selected function is "Scan," it is determined that the logon user has operation authority for "Scan" if "Scan" is included in the authority information.

If the logon user has operation authority for the selected function (YES at step S502), at step S503, the authentication control part 221 causes an operation screen corresponding to the function to be displayed on the operations panel 25. If the logon user does not have operation authority for selected function (NO at step S502), at step S504, the authentication control part 221 causes, for example, an error screen to be displayed on the operations panel 25. The error screen includes, for example, a message indicating that the operator does not have operation authority for the selected function.

As described above, according to the second embodiment, it is possible to ensure flexibility with respect to restriction on the use of the image forming apparatus 20 based on a PIN code. That is, because it is possible to cause operation authority to vary from PIN code to PIN code, it is possible to flexibly provide guest users with operation authority compared with the case where uniform operation authority is set for guest users.

In the above-described embodiment, a case is illustrated where the identification information of a function whose use is to be authorized is specified in the PIN request email message, while the identification information of a function whose use is to be prohibited may also be specified in the PIN request email message.

In the above embodiments, a description is given of the case where a print request or a PIN code issuance request is transmitted in the form of email and a PIN code is returned in the form of email. The communication method for requesting printing or issuance of a PIN code and for returning a PIN code is not limited to email. For example, such requesting and returning may be performed using a Web interface or other communication methods. For example, in the case of a Web interface, the destination address of the print request email message or the PIN request email massage may be replaced with a specific URL. Furthermore, the source address may be replaced with the IP address of a transmission source from which a request is transmitted. For example, the IP address of the user terminal 30 used by an authorized user may be stored in the user information storage part 52 in place of or along with the email address. Furthermore, the IP address of a transmission source from which a request is transmitted may be stored in the PIN code storage part 19 in place of the email address.

Furthermore, in the above-described embodiments, the PIN code is illustrated as an example of identification information for identifying authority to operate the image forming apparatus 20. Alternatively, the PIN code may be used as identification information for identifying authority to operate other apparatuses such as projectors and video conference systems.

In the above-described embodiments, the PIN code is an example of authority identification information. The email reception part 11 is an example of a reception part. The PIN code generation part 14 is an example of a generation part. The email returning part 17 is an example of a transmission part. The PIN code storage part 19 is an example of a storage part. The scanned image is an example of image data input by an apparatus.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

What is claimed is:

1. An information processing system, comprising:
    at least one computer connected to an apparatus via a network, the at least one computer including a memory storing a program and a processor configured to execute the program stored in the memory to cause the at least one computer to
    receive a request including destination information from a user;
    store authority identification information for identifying operation authority to operate the apparatus in the memory in association with the destination information included in the request, in response to receiving the request; and
    transmit the authority identification information to the user as a response to the received request,
    wherein the apparatus is configured to
       receive the authority identification information input by the user;
       acquire output data by scanning an original material set by the user; and
       deliver the output data acquired by the scanning to a delivery destination, wherein the destination information associated with the authority identification information input by the user is designated as the delivery destination.

2. The information processing system as claimed in claim 1, wherein the at least one computer is further caused to issue the authority identification information in response to receiving the request, and to store the issued authority identification information.

3. The information processing system as claimed in claim 1,
    wherein the memory further stores user information including an address of the user in association with user identification information,
    wherein the apparatus is further configured to obtain the user identification information or the authority identification information, wherein the at least one computer is caused to receive a first email as the request, the first email including an address used as the destination information, and wherein the apparatus is configured to deliver the output data by transmitting a second email including the output data to the delivery destination, wherein the delivery destination is the address of the user associated with the user identification information when the apparatus obtains the user identification information, and is the destination information associated with the authority identification information when the apparatus obtains the authority identification information.

4. The information processing system as claimed in claim 1, wherein the at least one computer is further caused to determine a function of the apparatus specified in the request, and store the authority identification information and identification information of the function specified in the request in correlation with each other in the memory, and wherein the apparatus is further configured to limit an available function of the apparatus based on the identification information of the function stored in the memory in correlation with the authority identification information, when the apparatus obtains the authority identification information.

5. An information processing method in an information processing system including at least one computer connected to an apparatus via a network, the at least one computer including a memory storing a program and a processor configured to execute the program stored in the memory, the information processing method comprising:

receiving, implemented by the processor executing the program, a request including destination information from a user;

storing, implemented by the processor executing the program, authority identification information for identifying operation authority to operate the apparatus in the memory in association with the destination information included in the request, in response to receiving the request;

transmitting, implemented by the processor executing the program, the authority identification information to the user as a response to the received request;

receiving, by the apparatus, the authority identification information input by the user;

acquiring, by the apparatus, output data by scanning an original material set by the user; and delivering, by the apparatus, the output data acquired by the scanning to a delivery destination, wherein the destination information associated with the authority identification information input by the user is designated as the delivery destination.

6. The information processing method as claimed in claim 5, further comprising:

issuing, implemented by the processor executing the program, the authority identification information in response to receiving the request, wherein said storing stores the issued authority identification information.

7. The information processing method as claimed in claim 5, further comprising:

obtaining, by the apparatus, user identification information or the authority identification information, wherein the memory further stores user information including an address of the user in association with the user identification information, wherein said receiving implemented by the processor receives a first email as the request, the first email including an address used as the destination information, and wherein said delivering delivers the output data by transmitting a second email including the output data to the delivery destination, wherein the delivery destination is the address of the user associated with the user identification information when said obtaining obtains the user identification information, and is the destination information associated with the authority identification information when said obtaining obtains the authority identification information.

8. The information processing method as claimed in claim 5, further comprising:

determining, implemented by the processor executing the program, a function of the apparatus specified in the request;

storing, implemented by the processor executing the program, the authority identification information and identification information of the function specified in the request in correlation with each other in the memory; and limiting, by the apparatus, an available function of the apparatus based on the identification information of the function stored in the memory in correlation with the authority identification information, when said obtaining obtains the authority identification information.

9. A non-transitory computer-readable recording medium with an executable program recorded thereon, wherein the program, when executed by a processor of at least one computer connected to an apparatus via a network and by the apparatus, causes the at least one computer and the apparatus to execute a process that comprises:

receiving, implemented by the processor, a request including destination information from a user;

storing, implemented by the processor, authority identification information for identifying operation authority to operate the apparatus in the memory in association with the destination information included in the request, in response to receiving the request;

transmitting, implemented by the processor, the authority identification information to the user as a response to the received request;

receiving, by the apparatus, the authority identification information input by the user;

acquiring, by the apparatus, output data by scanning an original material set by the user; and delivering, by the apparatus, the output data acquired by the scanning to a delivery destination, wherein the destination information associated with the authority identification information input by the user is designated as the delivery destination.

10. The non-transitory computer-readable recording medium as claimed in claim 9, wherein the process further comprises:

issuing, implemented by the processor, the authority identification information in response to receiving the request, wherein said storing stores the issued authority identification information.

11. The non-transitory computer-readable recording medium as claimed in claim 9, wherein the process further comprises:

obtaining, by the apparatus, user identification information or the authority identification information, wherein the memory further stores user information including an address of the user in association with the user identification information, wherein said receiving implemented by the processor receives a first email as the request, the first email including an address used as the destination information, and wherein said delivering delivers the output data by transmitting a second email including the output data to the delivery destination, wherein the delivery destination is the address of the user associated with the user identification information when said obtaining obtains the user identification information, and is the destination information associated with the authority identification information when said obtaining obtains the authority identification information.

12. The non-transitory computer-readable recording medium as claimed in claim 9, wherein the process further comprises:

determining, implemented by the processor, a function of the apparatus specified in the request;

storing, implemented by the processor, the authority identification information and identification information of the function specified in the request in correlation with each other in the memory; and limiting, by the apparatus, an available function of the apparatus based on the identification information of the function stored in the memory in correlation with the authority identification information, when said obtaining obtains the authority identification information.

13. The information processing system as claimed in claim 1, wherein the at least one computer is caused to transmit the authority identification information to the user in response to determining an absence of a data attachment to the received request, when the destination information included in the received request is a source address of the received request and the source address is stored in the memory in association with user information of the user.

14. The information processing method as claimed in claim 5, wherein said transmitting transmits the authority identification information to the user in response to determining an absence of a data attachment to the received request, when the destination information included in the received request is a source address of the received request and the source address is stored in the memory in association with user information of the user.

15. The non-transitory computer-readable recording medium as claimed in claim 9, wherein said transmitting transmits the authority identification information to the user in response to determining an absence of a data attachment to the received request, when the destination information included in the received request is a source address of the received request and the source address is stored in the memory in association with user information of the user.

* * * * *